United States Patent [19]
Denney

[11] Patent Number: 5,819,631
[45] Date of Patent: Oct. 13, 1998

[54] SYNTHETIC FOAM SURFACE CONTOURING MACHINE

[75] Inventor: Denys Denney, Bear, Del.

[73] Assignee: Foamex L.P., Linwood, Pa.

[21] Appl. No.: 691,399

[22] Filed: Aug. 2, 1996

[51] Int. Cl.[6] ............................................. B26D 3/00
[52] U.S. Cl. ..................... 83/874; 83/176; 83/177; 83/651.1; 83/13
[58] Field of Search .................... 83/176, 177, 651.1, 83/874, 13; 74/665 GA, 665 F, 665 G, 421 A; 425/308; 264/125

[56] References Cited

U.S. PATENT DOCUMENTS

| | | | |
|---|---|---|---|
| 2,749,982 | 6/1956 | Handt | 83/874 |
| 2,902,091 | 9/1959 | Dahle | 83/176 |
| 2,937,242 | 4/1960 | Pickles | 74/665 G |
| 3,213,709 | 10/1965 | Björk | 74/665 G |
| 3,690,203 | 9/1972 | Huttemann | 83/176 |
| 3,730,031 | 5/1973 | Huttemann | 83/176 |
| 3,888,138 | 6/1975 | Hiersig | 74/665 G |
| 4,258,580 | 3/1981 | Lowe | 74/109 |
| 4,314,388 | 2/1982 | Hartmannsgruber et al. | 74/665 G |
| 4,472,938 | 9/1984 | Brems | 74/665 G |
| 4,669,333 | 6/1987 | Matsuda et al. | 74/665 GA |
| 4,679,461 | 7/1987 | Mizuguchi et al. | 74/665 GA |
| 4,683,791 | 8/1987 | Demont | 83/874 |
| 4,700,447 | 10/1987 | Spann | 83/176 |
| 4,796,487 | 1/1989 | De Barnardi | 74/665 GA |
| 4,831,461 | 5/1989 | Ohta et al. | 358/296 |
| 4,915,284 | 4/1990 | Goda | 266/177 |
| 4,932,280 | 6/1990 | Becker et al. | 74/665 G |
| 5,042,315 | 8/1991 | Fahy et al. | 74/411 |
| 5,043,617 | 8/1991 | Rostron | 74/665 G |
| 5,095,920 | 3/1992 | Mattei | 83/170 |
| 5,103,689 | 4/1992 | Dollhopf | 74/665 GA |
| 5,213,010 | 5/1993 | Hayafusa et al. | 74/665 GA |
| 5,413,265 | 5/1995 | Stahl et al. | 74/421 A |
| 5,534,208 | 7/1996 | Barr et al. | 83/176 |
| 5,588,328 | 12/1996 | Nihei et al. | 74/421 A |
| 5,688,538 | 11/1997 | Barr et al. | 83/176 |

*Primary Examiner*—Maurina T. Rachuba
*Attorney, Agent, or Firm*—Natan Epstein; Beehler & Pavitt

[57] ABSTRACT

A foam contouring machine has first and second rollers mounted to a machine frame for rotation about mutually parallel axes. The first and second rollers have different diameters and define between them a nip. A cutting edge is mounted for cutting foam material drawn through the nip by rotation of the rollers. Each roller has a drive motor, and a controller is connected to each drive motor for independently controlling the speed of rotation of the rollers, the controller equalizing the speed of surface rotation of the rollers for rollers of different diameters. The first roller may be a pattern roller and the second roller may be a backup or compression roller. The machine also has a drive coupling assembly, which has selectable first and second modes of operation for converting operation of the machine between a foam surfacing and a foam profiling operation. The first mode independently couples each of the motors to a corresponding one of the rollers. The second mode couples only one of the motors to both of the rollers, so that the rollers are interlocked for rotation.

20 Claims, 6 Drawing Sheets

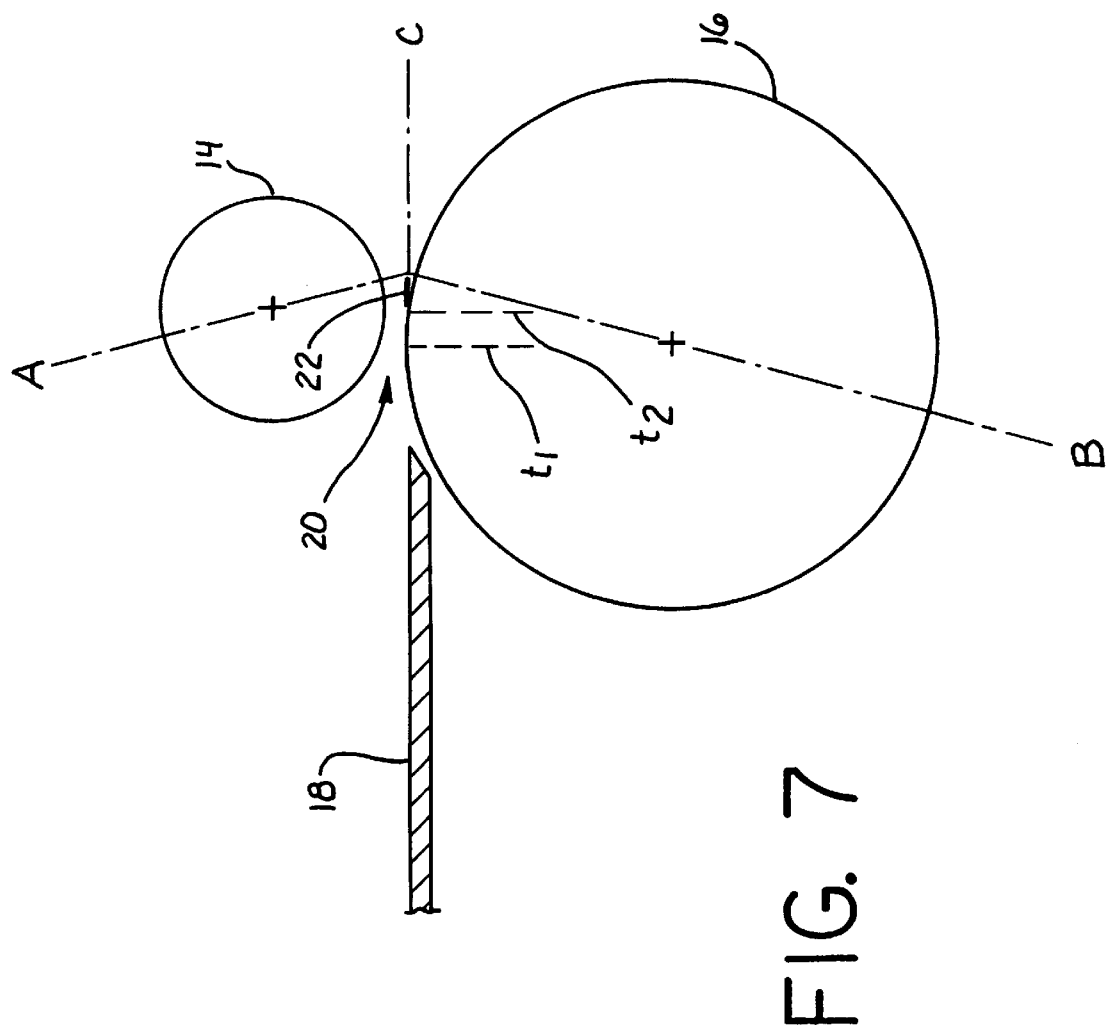

SYNTHETIC FOAM SURFACE CONTOURING MACHINE

BACKGROUND OF THE INVENTION

1. Field of the Invention

This invention pertains to machinery used in the cutting and shaping of synthetic foam and more particularly is directed to foam cutting machines particularly adapted for the efficient surface contouring of resilient synthetic foam materials, including a cutting machine convertible between such surface contouring and conventional profiling applications.

2. State of the Prior Art

The profiling of compressible synthetic foam is a well known process in which a sheet of resilient foam material is compressed between two profiling rollers and driven against a cutting blade in a compressed condition. The profiling rollers typically have teeth which mesh together in the gap or nip defined between the rollers. The foam compressed between the meshing teeth is sliced along a midpoint in its thickness into two sheets of equal thickness. When the two resulting sheets return to an uncompressed state, the two foam surfaces created by slicing the original sheet expand to define similar surfaces with alternating peaks and depressions which are geometrically complementary to each other.

Profiling machines designed for this purpose are commercially available from several manufacturers. The basic design of all such profilers is similar. Profilers are characterized in that the two rollers are of equal diameter and both rollers have a surface pattern or geometry designed to selectively compress the foam material in accordance with a desired surface geometry of the complementary profiled surfaces created by slicing the thickness of the foam sheet. Another characteristic of such profilers is that the two rollers must be driven in precise step with each other. A mismatch in speed between the rollers results in geometric distortion of the profiled surfaces or actual tearing of the foam. Even a very small difference in relative speed of the rollers causes sufficient distortion to make the resulting foam product commercially worthless. To avoid this problem, conventional profiling machines employ a gear arrangement by which both rollers are synchronously driven by a single drive motor.

U.S. Pat. No. 5,534,208 discloses a method for shaping resilient foam materials which differs from conventional profiling in that foam material is shaped or contoured to a desired surface geometry by selectively compressing portions of foam material below a cutting blade and cutting away uncompressed portions of the foam. This process differs from profiling in that foam is selectively removed from the existing surface of the original foam blank, and typically the thickness of the desired foam article is substantially the thickness of the original foam sheet. The surface contouring process further differs from conventional profiling in that three dimensional foam surfaces of arbitrary geometry can be produced with a high degree of fidelity because the cutting edge is positioned very near the surface of a pattern or die surface, so that little or no foam thickness is interposed between the pattern surface and the cutting edge. On the other hand, in conventional profiling a considerable thickness of foam is compressed between the profiler rollers and the cutting edge, resulting in a characteristic loss of fidelity of the resulting profiled surface relative to the roller geometry. Sharp edges on the profiler rollers are reproduced as smooth curves on the profiled surface. By contrast, the foam surface contouring process disclosed in the 5,534,208 patent can closely reproduce a great variety of sharp edged surface geometries not possible by previously known profiling technology. These and other advantages of the proprietary surface contouring process are described in the specification of that patent.

The foam surface contouring process as described in the 5,534,208 patent was initially practiced on a conventional, commercially obtained profiling machine adapted for the novel process by substituting a pattern roller and a smooth surfaced backup roller for the conventional profiling rollers. The pattern and backup rollers could be driven by the original unmodified motor drive, so that both rollers were driven at equal speed by the single motor of the original machine. This arrangement was found effective for relatively modest roller speeds and relatively shallow pattern geometries.

For conventional foam profiling the blade is typically spaced significantly in a downstream direction from the point of minimum separation of the rollers, and is also equidistant between the rollers since the foam sheet is to be sliced midway in its thickness. A typical setup is to space the profiling rollers about one inch apart and the cutting blade midway in the gap one half inch from each roller. Furthermore, the spacing of the blade downstream of the point of minimum separation of the rollers is normally not critical within a relatively substantial range of positions.

As explained in the aforementioned U.S Pat. No. 5,534, 208, surface contouring of the foam material requires that the cutting blade be brought into a tangential position with the pattern roller. For typical surface contouring the cutting edge of the blade is positioned so that little or no foam is removed from the foam blank sheet other than the foam which is pressed into the recesses and depressions defined in the surface of the pattern roller. The optimal location of this tangent point on the pattern roller corresponds to the point of minimum separation between the two rollers and maximum compression of the foam. This requires the blade to be moved forward, i.e. towards the rollers and into actual contact or very near contact with the surface of the pattern roller. The commercial profile cutters permit repositioning of the blade towards and away from the rollers, and also permit the rollers to be individually indexed up or down within the machine frame relative to the blade. Consequently, the cutting edge can be brought into tangential relationship with a pattern roller in the original profile cutter by a combination of roller and blade adjustments.

The surface contouring process of the '208 patent lends itself to the efficient production of foam articles of many different types. Some articles are cut in one revolution of the pattern roller, and larger articles require a larger pattern circumference. Larger pattern rollers bring out limitations inherent in the commercial machines originally intended for profiling foam. Firstly, conventional profile cutting machines are designed to turn both rollers at the same speed. Consequently, a change in diameter of the pattern roller requires a similar change in the diameter of the compression roller if the original drive mechanism of the profile cutter is used for surface contouring. Also, larger patterns call for roller dimensions greater than those typically used in conventional profiling, until it is no longer possible to bring the cutting blade into optimum tangential position for surface contouring. This happens because of two characteristics common to all known commercially available profile cutting machines. The first is that the cutting blade has a very limited range of adjustment towards and away from the rollers in the cutting plane of the blade, typically about one half inch. The second is that raising and lowering of each roller is done along a corresponding roller indexing guide which is inclined, typically at an angle of 12 to 15 degrees away from the vertical, in a direction away from the cutting blade as the roller is moved away from the cutting plane. This angling of the roller indexing guides is advantageous because as the foam comes under compression between the rollers and the rollers are consequently urged apart, the rollers are not simply forced apart in a direction transverse to the cutting plane, but instead are forced resiliently apart and also slightly away from the cutting blade. The compressive force of the rollers therefore includes a force component which urges the compressed foam towards the edge of the cutting blade and improves the cutting action of the blade.

This geometry of commercially available profile cutters limits their usefulness for purposes of surface contouring applications. As the diameter of the rollers increases the axis of the roller is necessarily supported further away from the cutting plane of the blade. This means that the axis of the rollers are also displaced away from the blade, and the point of minimum spacing between the two rollers is likewise moved further from the blade along the cutting plane of the blade. Because of the limited range of blade adjustment provided in the commercial profile cutters, the point is rapidly reached where for rollers greater than a given diameter it is no longer possible to bring the blade into optimal tangential contact with the pattern roller at or very near the point of minimum spacing between the rollers, where maximum compression of the foam occurs.

While the unmodified commercial profile cutter may be used for surface contouring using smaller pattern roller sizes with equal diameter compression rollers, the full benefit of the surface contouring process calls for a foam cutting machine adapted to the requirements of this process.

SUMMARY OF THE INVENTION

The present invention addresses the aforementioned need by providing a foam surface contouring machine which has first and second rollers mounted to a machine frame for rotation about mutually parallel axes, the first and second rollers being of different diameters and defining therebetween a nip; a cutting edge mounted for cutting foam material drawn through the nip by rotation of the rollers; first and second drive motors for driving the first and second rollers respectively; and a controller connected to the first and second drive motors for independently controlling the speed of rotation of the rollers, the controller being adjustable for equalizing the speed of surface rotation of the rollers for first and second rollers of different diameters.

The first roller may be a pattern roller and the second roller may be a backup or compression roller having a substantially smooth cylindrical surface. Typically the pattern roller is of substantially greater diameter than the compression roller. The first and second rollers may be interchangeable with other first and second rollers of different diameters.

In a presently preferred form of the invention the machine has a drive coupling assembly, such as a gearbox, operatively interposed between the drive motors and the rollers. The coupling assembly has selectable first and second modes of operation for converting operation of the machine between foam surface contouring and foam profiling operation. The first mode of operation is operative for independently coupling each of the motors to a corresponding one of the rollers, and the second mode of operation is operative for coupling only one of the drive motors to both of the rollers. In this second mode it is preferred that the two rollers be interlocked for rotation with each other.

The coupling assembly may include a gearbox in which one of the rollers is normally driven by one of the drive motors, and a gear element is selectively repositionable between a first and a second position corresponding respectively to the first and second modes of operation.

For example, the first roller is at all times driven by the first drive motor and, in the first position, the repositionable gear element drivingly engages the second drive motor to the second roller. In this first mode of operation the rollers are driven by the respective drive motors independently of one another. In the second position the displaceable gear element drivingly engages the first drive motor also to the second roller, preferably by mechanically interlocking the second roller for rotation with the first roller. In this second mode of operation both rollers are driven by the first motor only. The repositionable gear element may be displaced between its two positions in an axial direction of the gear element, for example, along a supporting shaft.

These and other features, advantages and improvements according to this invention will be better understood by reference to the following detailed description and accompanying drawings.

BRIEF DESCRIPTION OF THE DRAWINGS

FIG. 7 schematically illustrates the geometry of the tangent point of contact of the blade in relation to the inclined roller indexing guides;

DETAILED DESCRIPTION OF THE PREFERRED EMBODIMENTS

Figure 1:
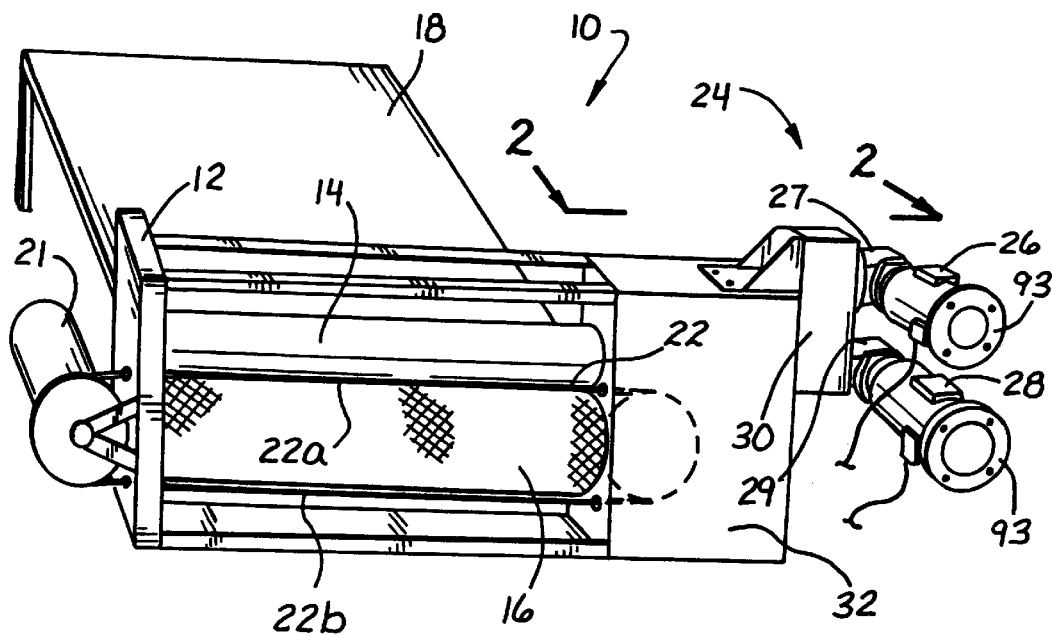
FIG. 1 is a perspective view of the surface contouring machine of this invention, seen from the output or downstream side of the rollers.

With reference to the accompanying drawings, FIG. 1 shows a foam surface contouring machine, generally designated by the numeral 10, according to the present invention. The surface contouring machine 10 is made by modification of a commercially available foam profile cutter. The commercial machine has a machine frame 12 including supports for journaling an upper roller and a lower roller to the frame. A foam feed table 18 on the intake or upstream side of the rollers serves to align foam sheet material with a gap 20 defined between the rollers. A blade 22 is mounted on the output or downstream side of the rollers. The cutting blade 22 is a continuous blade driven by motor 21, and has an upper run 22a with a cutting edge facing the gap 20 and a lower return run 22b.

The original profile cutter includes a housing 32 which originally supports a single gearmotor (not shown in the drawings) with two output shafts. Prior to modification, the gearmotor output shafts are connected for driving two similar sized profiling rollers by means of coupling shafts 34 and 36. Universal joints 38 and 40 connect each coupling shaft to a corresponding output shaft of the gearmotor and the axle of a roller respectively. The universal joints permit repositioning of the rollers up or down on the machine frame 12 while maintaining coupling with the motor drive. The coupling shafts are constructed so as to extend or retract by telescoping to the required length during such repositioning.

According to this invention, the original profiling rollers of the commercial profile cutter are replaced with a compression roller and a pattern roller in the surface contouring machine 10. In FIG. 1, the upper roller is a compression roller 14 with a smooth cylindrical surface. The lower roller is a pattern roller 16 and has a three dimensional surface geometry which determines the surface contour of the resulting foam product as described in U.S Pat. No. 5,534,208. The rollers 14 and 16 are spaced apart to define a gap 20 which will vary in width depending on the thickness and hardness, among other factors, of the foam being cut. A typical width of the gap 20 is about one quarter inch.

As explained earlier in this specification, the commercial profile cutter has roller indexing guides which permit adjustment of the roller spacing, i.e. changing the width of the gap between the rollers and also to accommodate the different mounting points of different sized rollers. The upper and lower roller indexing guides are indicated in FIG. 7 by divergent lines A and B, respectively, which intersect at the horizontal cutting plane C of blade 22. Each line A and B makes a 15 degree angle with a vertical line perpendicular to the cutting plane.

For purposes of surface contouring, the optimum location of tangential contact between the cutting blade 22 and the pattern roller is at or very near the point of maximum compression of foam between the rollers 14 and 16, which corresponds to the point of minimum spacing between the rollers. The previously described limitation, created by the angled roller indexing guides coupled with the limited horizontal adjustment range of the cutting blade position, is avoided in the modified machine 10 by keeping the diameter of the compression roller 14 small in relation to the diameter of the pattern roller 16. This has the effect of keeping the point of minimum spacing between the rollers closer to the cutting edge of the blade 22 than would be the case for a compression roller of diameter equal to the pattern roller diameter.

This effect is illustrated in FIG. 7 by the spacing between lines $t_1$ and $t_2$. Line $t_1$ indicates the tangent point between the blade cutting plane C and the pattern roller 16 for the case where the compression roller is of equal diameter to pattern roller 16. The position of tangent point $t_1$ is determined by the narrowest point of the gap 20 between such equal sized rollers. Tangent point $t_1$ will lie along a line perpendicular to the cutting plane C connecting the centers of the equal sized rollers.

Line $t_2$ indicates the location of the blade tangent point resulting from substitution of the smaller diameter compression roller 14. The point of minimum width of the gap 20 shifts to the right in the drawing, towards the blade 22, consequently also shifting the optimum tangent point for the blade. This modified roller geometry brings the optimum tangent point of the blade for larger diameter pattern rollers within the existing range of horizontal adjustment of the cutting blade 22. A compression roller diameter of 120 millimeters has been found to work well with a range of pattern roller diameters from about eight inches to about twelve inches.

However, the motor drive of commercially available profile cutters is specifically designed for driving two rollers of equal diameter. Different sized rollers require a motor drive capable of driving the two rollers independently of each other and at different shaft speeds so as to equalize the speeds of surface rotation of the two rollers. Failure to do so will cause the top and bottom surfaces of the foam sheet compressed between the rollers to move at different speeds, causing distortion of the resulting surface pattern or actual tearing of the foam.

Figure 2:
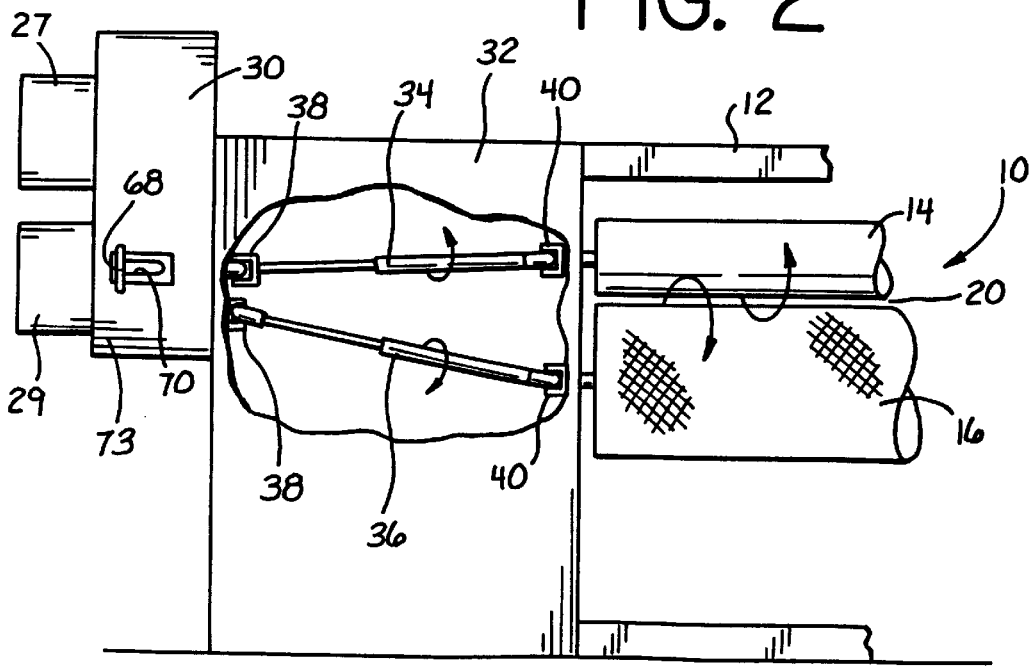
FIG. 2 is a fragmentary elevational view of the input or upstream side of the surface contouring machine of FIG. 1, partly broken away to show the coupling shafts between the gearbox and the rollers.

Accordingly, for purposes of the present invention, the commercially available profile cutter is further modified by providing a dual motor drive 24 capable of matching the surface speed of rotation of different sized rollers. The motor drive 24, as shown in FIGS. 1 and 2, includes an upper drive motor 26, a lower drive motor 28 and a gearbox 30. The dual motor drive 24 is substituted for the single original gearmotor of the commercial machine.

Figure 3:
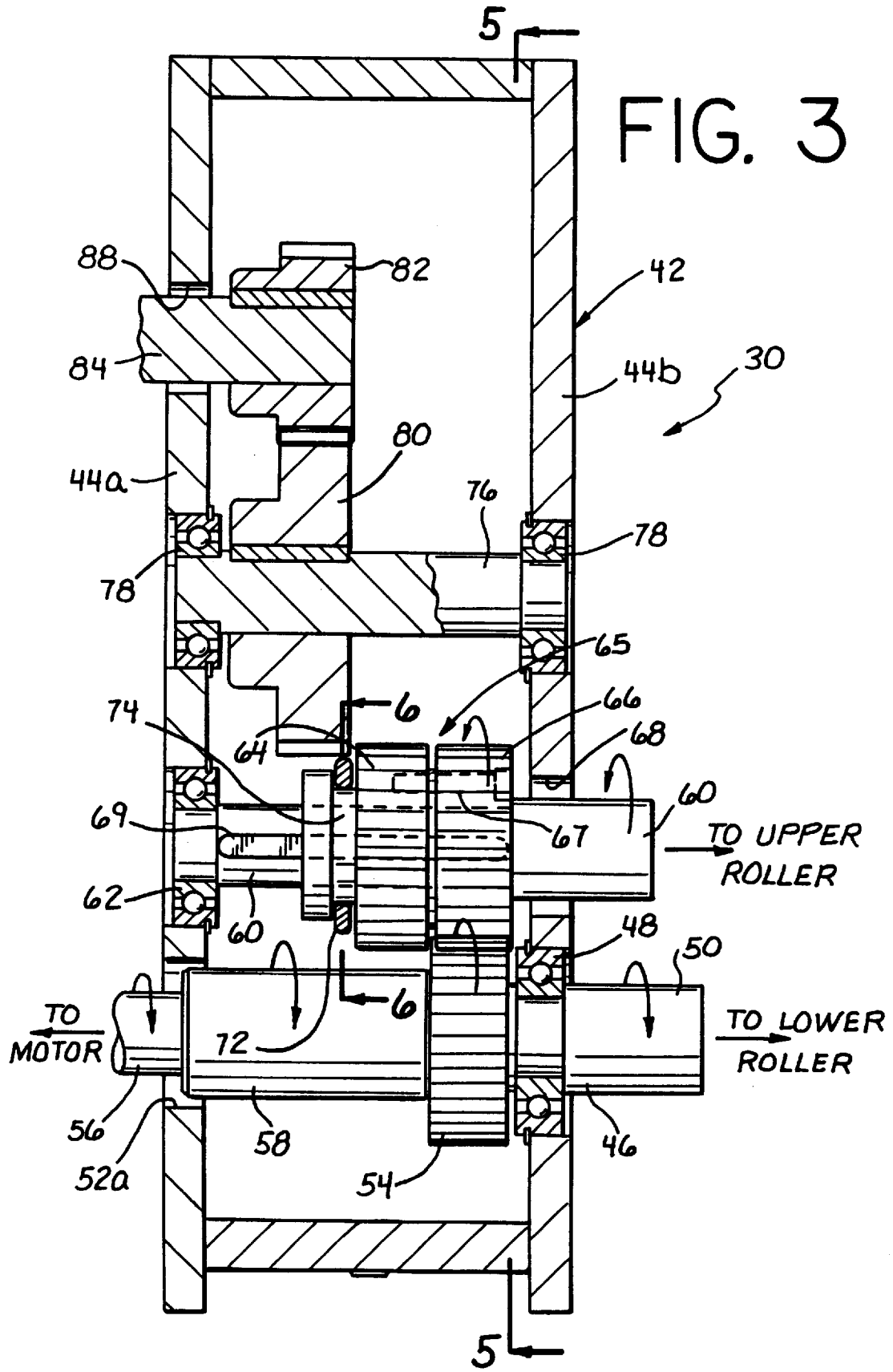
FIG. 3 is a section taken in front elevation of the gearbox, showing the sliding gear assembly positioned for operation in the profiling mode.

Turning to FIG. 3, the gearbox 30 has a gearbox housing 42 including opposing side walls 44a, 44b. A lower drive shaft 46 is journaled to side wall 44b by means of roller bearing 48. The lower drive shaft 46 supports a lower drive gear 54, and is coupled through opening 52a in side wall 44a to a motor drive shaft 56 by means of coupling sleeve 58. An upper drive shaft 60 is journaled to side wall 44a by roller bearing 62 and extends through opening 68 in side wall 44b.

Figure 4:
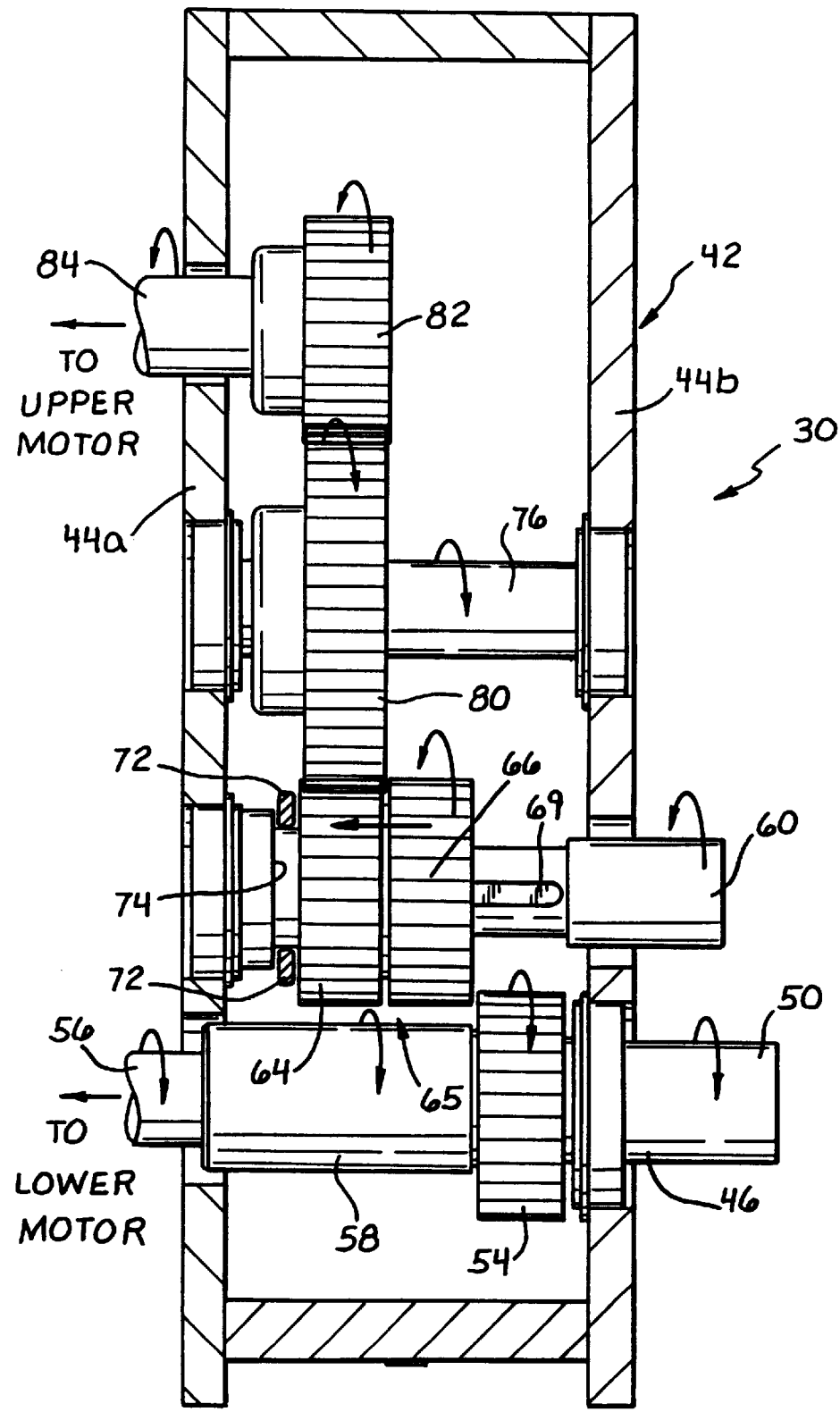
FIG. 4 is a view as in FIG. 3, showing the sliding gear assembly positioned for operation in the surface contouring mode.
Figure 5:
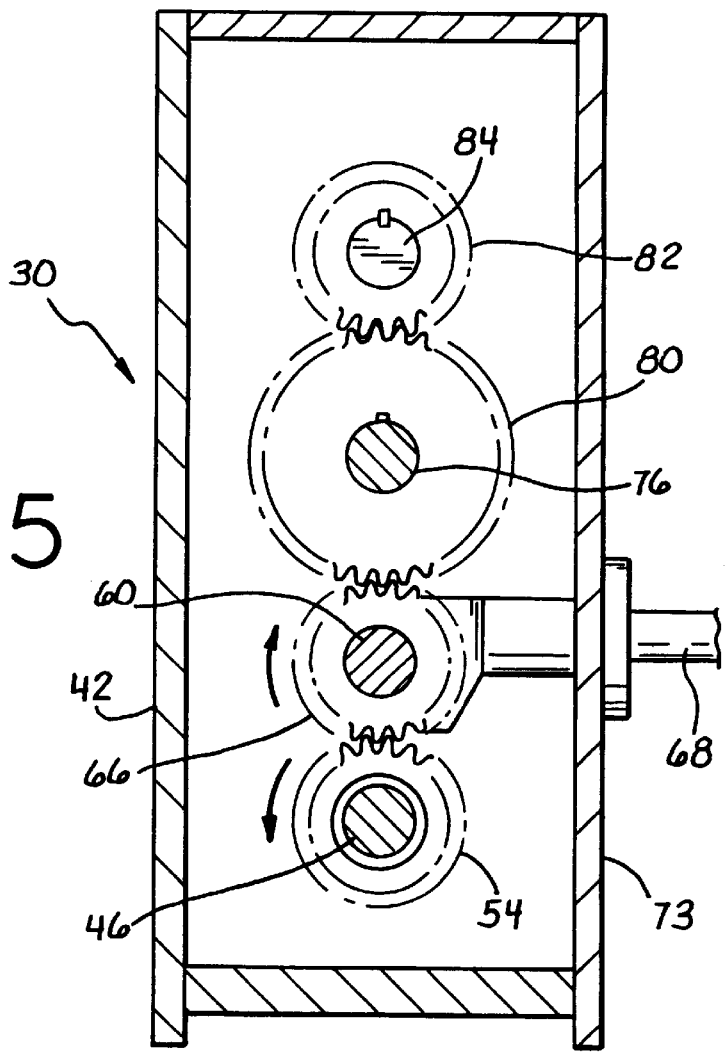
FIG. 5 is a section of the gearbox taken along line 5—5 in FIG. 4.
Figure 6:
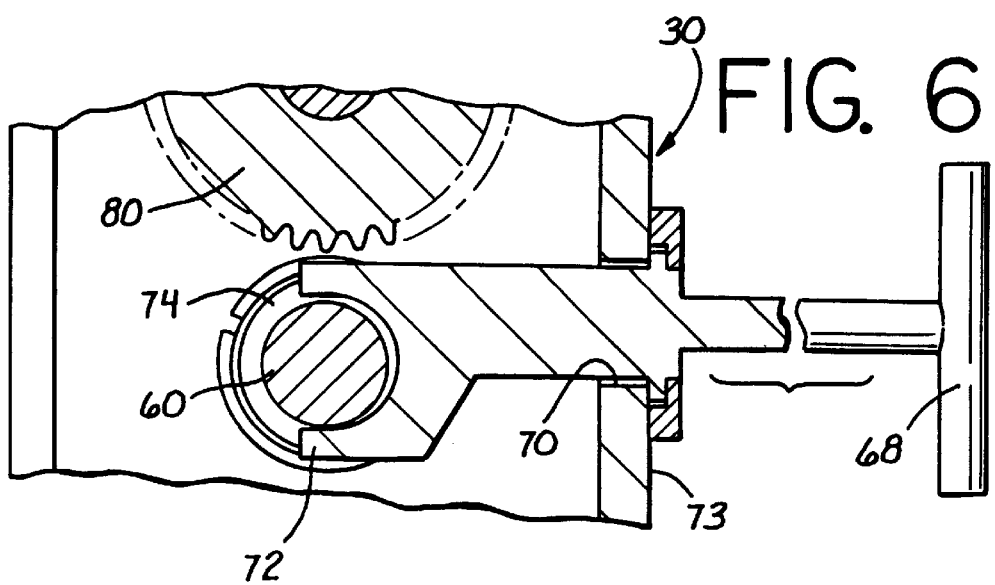
FIG. 6 is a fragmentary section taken along line 6—6 in FIG. 4 to illustrate the arrangement of the handle for selecting between the operating modes of the gearbox.

The upper drive shaft 60 carries a sliding gear assembly 65 which includes two gears 64 and 66 fixed to each other by bolt 67. Gears 64, 66 are keyed for rotation with shaft 60 by a key 69 projecting radially from the shaft into a corresponding radial slot defined in each of the gears. However, the gear assembly 65 is free to slide as a unit in an axial direction along the key 69 on shaft 60 between two end positions. The sliding gear unit 65 is displaced between its left and right hand end positions by means of a handle 68 which extends to the exterior of the gearbox housing through a horizontal slot 70 in a front wall 73 of the gearbox housing 42, as best seen in FIG. 6, and has at its inner end a fork 72 which is laterally captive in a collar 74 attached to the sliding gear unit 65 as indicated in FIGS. 3 and 4. A transfer shaft 76 is journaled to both side walls 44a, 44b by means of roller bearings 78, and a transfer gear 80 is keyed for rotation with shaft 68. The transfer gear 80 is in mesh with an upper motor input gear 82 keyed to upper motor input shaft 84 which enters the gearbox housing through opening 88.

The two end positions of the sliding gears 64, 66 are shown in FIGS. 3 and 4. In the position of FIG. 3 the sliding gear unit 65 is in its right hand position and engaged in a first gear train consisting of gears 66 and 54, in which gear 66 is in mesh with lower drive gear 54, and gear 64 is free. In this condition of the mechanism the lower and the upper roller drive shafts 46, 60 are interlocked for synchronized rotation with each other, and the upper roller drive shaft 60 turns in response to rotation of the lower drive shaft 46 by the lower drive motor input 56. This mode of operation of the gearbox 30 is analogous to that of the original gearmotor drive of the commercial profile cutter, that is, both rollers are driven by a single drive motor and the rollers are geared to each other.

In this mode of operation the gearbox is in a profiling mode of operation, for driving a pair of conventional profiling rollers of equal diameter.

In FIG. 4 the sliding gear unit 65 with the two gears 64, 66 is shown in its left hand position. In this condition gear 64 is in mesh with transfer gear 80 while gear 66 is free of the lower drive gear 54 and is unaffected by rotation of the lower drive shaft 46. The upper motor input shaft 76 is now connected for turning the upper roller drive shaft 60 through a second gear train which includes the upper motor input gear 82, the transfer gear 80, and gear 64 of the sliding gear unit. In this mode of operation the gearbox operates to drive the two rollers independently of each other, each driven by one of the two separate drive motors. This mode of operation is the surface contouring mode of the gearbox, for driving compression and pattern rollers of different diameters as illustrated in FIG. 7.

In either mode of operation the gearbox has a unity gear ratio between the motor input shafts and the roller drive shafts.

In the surface contouring mode of operation the surface speed of rotation of the different sized compression and pattern rollers must be closely matched to prevent distortion or tearing of the foam material compressed between the rollers. This is accomplished partly by reduction gearing of the drive motor speed and partly by individual electronic speed control of the drive motors.

In a presently preferred embodiment of the invention the drive motors are 2300 R.P.M., D.C. motors. The upper drive motor 26 is rated at 5 H.P. (five horsepower) and the lower drive motor 28 at 7.5 H.P. (seven and one half horsepower). The motors are connected to corresponding gearbox input shafts 76, 56 by right-angle gearboxes 27, 29 partially shown in FIG. 1. The upper gearbox 27 has a gear ratio of 24:1 while the lower gearbox 29 has a gear ratio of 50:1. This difference in gear ratios sets a base speed ratio of about 2:1 for the two rollers 14, 16. For the preferred roller dimensions given above, the upper compression roller 14 is generally one half the diameter of the lower pattern roller 16, so that the greater speed of the compression roller provides a surface speed of rotation of that roller which is a first approximation to the surface speed of rotation of the larger but slower pattern roller.

Figure 9:
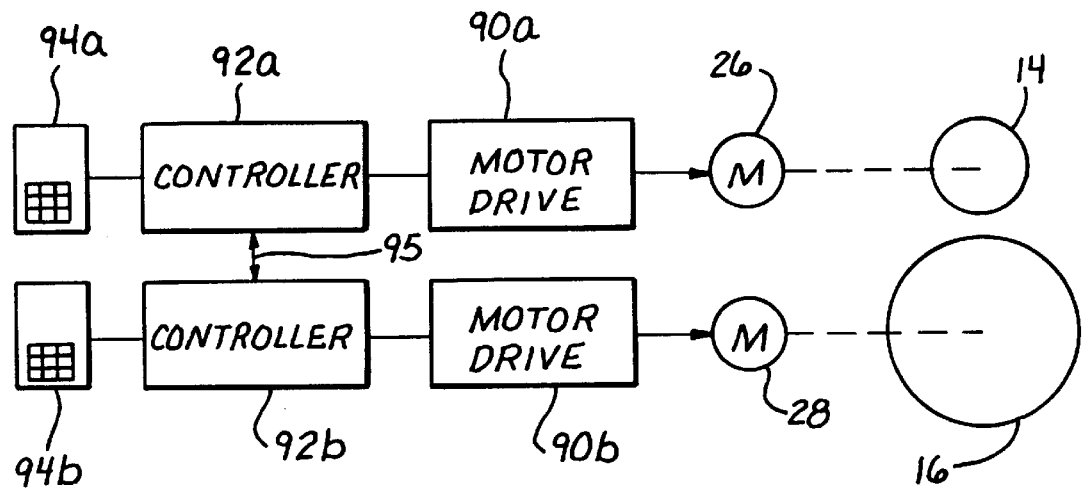
FIG. 9 is a block system diagram of the dual motor control system for the surface contouring machine of FIG. 1.

Fine control over both absolute and relative roller speeds is obtained by means of an electronic motor control system illustrated in the block diagram of FIG. 9. Each D.C. drive motor 26, 28 is supplied with D.C. power by a corresponding electronic motor drive 90a, 90b. Each electronic motor drive in turn is controlled by a corresponding electronic controller 92a, 92b. Each controller 92a, 92b has a digital keypad input 94a, 94b for entering a setting of the desired speed of the corresponding drive motor. Each controller receives an input signal representative of the motor speed from a magnetic shaft encoder 93 mounted on the corresponding motor and controls the respective motor drive to maintain the desired motor speed setting. The two controllers are interconnected in master-slave relationship as suggested by the bi-directional arrow 95, such that the upper drive motor 26 is slaved to the lower drive motor 28. That is, the absolute speed of both rollers 14, 16 is initially determined by the speed setting of the lower motor controller 92b. Thereafter, a fine adjustment of the surface speed of the upper roller relative to the lower roller may be made by increasing or decreasing its speed, for example, over a range of plus or minus five percent, by means of the upper motor controller 92a, to exactly match the surface speeds of rotation of the two rollers. Suitable motors, motor drives and electronic controllers for the system depicted in FIG. 9, as well as the right angle gears 27, 29, are commercially available from a variety of manufacturers and suppliers. For example, Baldor D.C. motors may be driven with Fincor D.C. drives, rated at 10 H.P. for the motor ratings given earlier, and controlled by means of Fenner M-Trim controllers. Suitable right angle gears are available under the EuroDrive brand name.

Figure 8:
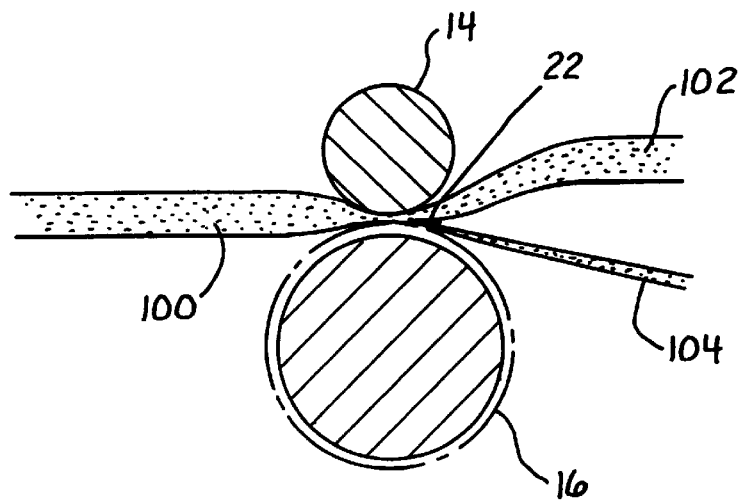
FIG. 8 schematically illustrates a sheet of foam being surface contoured between the pattern and compression rollers.

As illustrated in FIG. 8, in the surface contouring mode of operation of the machine 10 the rollers 14, 16 compress a blank sheet of foam 100, which normally is a continuous sheet fed from a large roll, and advance the compressed foam against the cutting edge of blade 22. The output of the surface contouring machine 10 depends on the target article being produced. The product may be also in continuous sheet form, as for example, contoured foam underlayment for floor carpeting, or may consist of discrete parts cut from the continuous original sheet, as for example, foam underlayments cut and surface contoured to fit the floor pan of an automobile underneath carpeting. The first example is illustrated in FIG. 8 where the target product 102 is the continuous foam which passes between the compression roller 14 and the cutting blade 22, and the material pressed into the pattern roller 16 and cut away by the blade makes a continuous sheet or web 104 of waste foam. In the second example, not shown in the drawings, the target product is the foam pressed into an appropriately shaped depression on the surface of the pattern roller and cut away from the continuous sheet, e.g., one article for each revolution of the pattern roller, while the remaining portion of the continuous sheet is scrapped. In the latter case the thickness of the target article will be nearly the entire thickness of the blank foam sheet 100 to minimize waste.

Best surface contouring results may require making some adjustment of the actual tangent contact point of the cutting blade 22 with the pattern roller surface towards or away from the point of minimum spacing between the rollers. The optimum position of the tangent contact point may vary somewhat, within a relatively narrow range, depending on the type and hardness of foam being cut and the pattern roller diameter. For each such combination of parameters a setup procedure involving some initial trial and error may be required to establish optimum machine settings for production runs. In most cases the edge of the cutting blade will make actual contact with the surface of the pattern roller, so that portions of the original surface of the foam blank are preserved in the contoured surface. In some circumstances, however, it may be desirable to space the cutting edge slightly away from such contact. For example, where separate cuts are to be made at spaced apart locations on the surface of the foam blank, so that the foam being removed is not connected by the design of the surface pattern, then it may be desirable to cut a thin continuous layer of foam away from the original surface of the foam blank in order to make a thin web connecting the foam pieces cut away at such separate locations for easy collection and disposal of the waste material as a continuous sheet. In this case the cutting edge of the blade 22 may be spaced from the surface of the pattern roller by one or two thousands of an inch, for example.

The machine 10 modified according to this invention is readily convertible between a surface contouring configuration and a profiling configuration, and is in effect a dual purpose machine. The conversion is made simply by changing rollers and selecting the desired mode of operation of the motor drive 24 by moving the handle 68 to the appropriate position on the gearbox.

In an alternate form of the invention a commercial profile cutter may be modified for dedicated use as a surface contouring machine, by substituting a gear axially fixed on the upper roller drive shaft 60 in place of the sliding gear unit 65. The fixed gear may be fixed in the position of gear 64 shown in FIG. 4, so that the two roller drive shafts 46, 60 are always driven independently of each other by a corresponding one of the two drive motors 26, 28 as described above in connection with the surface contouring mode of operation of the gearbox 30.

It should be understood that preferred and alternate embodiments of the invention have been described and illustrated for purposes of clarity and example only, and that still other changes, substitutions and modifications to these embodiments will be readily apparent to those having only ordinary skill in the art without thereby departing from the scope and spirit of the invention which is defined by the following claims.

What is claimed is:

1. A foam cutting machine comprising:

first and second rollers mounted to a machine frame for rotation about mutually parallel axes, said first and second rollers being of different diameters and defining therebetween a gap;

a cutting edge mounted for cutting material drawn through said gap by rotation of said rollers;

first and second drive motors for driving said first and second rollers respectively;

controller means connected to said first and second drive motors for independently controlling the speed of rotation of said rollers, said controller means being adjustable for equalizing the speed of surface rotation of said rollers for first and second rollers of different diameters; and a coupling assembly operatively interposed between said first and second drive motors and said rollers, said coupling assembly having selectable first and second modes of operation, said first mode of operation being operative for coupling each of said motors to a corresponding one of said rollers, said second mode of operation being operative for coupling only one of said drive motors to both of said rollers.

2. The machine of claim 1 wherein each of said first and second rollers is respectively interchangeable with other first and second rollers of different diameters.

3. The machine of claim 1 wherein said controller means are operative for enabling adjustment of said speed of surface rotation of said first and second rollers relative to each other.

4. The machine of claim 1 wherein said coupling assembly comprises gear means drivingly connected between said drive motors and said rollers including a gear element displaceable between a first position and a second position corresponding respectively to said first and second modes of operation.

5. A foam cutting machine comprising:

first and second rollers mounted to a machine frame for rotation about mutually parallel axes and defining therebetween a gap;

a cutting edge mounted for cutting material drawn through said gap by rotation of said rollers;

first and second drive motors; and a gearbox selectively operable in a first or a second mode, said first mode mechanically interlocking said rollers to each other for rotation by one of said drive motors, said second mode drivingly engaging each of said rollers to a corresponding one of said drive motors for rotation independent of one another.

6. The machine of claim 5 wherein said gearbox comprises a gear assembly displaceable for interlocking rotation of said rollers in said first mode and for drivingly engaging one of said rollers to a second one of said drive motors for rotation independent of the other of said rollers in said second mode of operation.

7. The machine of claim 6 wherein said gear assembly is displaceable in an axial direction thereof for selecting between said first and said second modes.

8. The machine of claim 5 further comprising motor controller means operative for independently controlling the speed of rotation of said rollers, said controller means being adjustable for equalizing the speed of surface rotation of said rollers for rollers of different diameters.

9. The machine of claim 5 wherein said gearbox comprises a first gear train for drivingly connecting said first drive motor and said second roller and a second gear train for drivingly connecting said second drive motor and said second roller, and a gear element selectively engageable with either said first gear train or said second gear train thereby to operate said gear assembly in said first mode or said second mode respectively.

10. A method for converting a profile cutting machine for use as a foam surface contouring machine, said profile cutting machine having a pair of profiling rollers mounted to a machine frame for rotation about mutually parallel axes and driven by a single motor drive, and a blade positioned for cutting foam material advanced by said rollers, comprising the steps of:

replacing said profiling rollers with a compression roller and a pattern roller, the compression roller having a diameter substantially smaller than the diameter of said pattern roller;

positioning said blade in substantially tangential relationship with said pattern roller;

substituting a dual motor drive for said single motor drive, said dual motor drive being arranged for driving said compression roller and pattern roller independently of each other; and providing means operative for substantially equalizing the surface speeds of rotation of said compression roller and pattern roller.

11. A foam cutting machine convertible between a profiling mode and a surface contouring mode, comprising:

first and second pairs of rollers interchangeably mounted to a machine frame for rotation about mutually parallel axes and defining therebetween a gap, one of said pairs comprising a pair of substantially similar profiling rollers and another of said pairs comprising first and second rollers of different diameters;

a cutting edge mounted for cutting material drawn through said gap by rotation of said rollers; and drive means selectable for driving said profiling rollers in mutually interlocked relationship in said profiling mode and for driving said first and second rollers of different diameters at different speeds of rotation from each other in said surface contouring mode.

12. The machine of claim 11 wherein said first roller is a pattern roller and said second roller is a compression roller.

13. The machine of claim 12 wherein said compression roller has a substantially smooth cylindrical surface.

14. The machine of claim 12 wherein said pattern roller is of substantially greater diameter than said compression roller.

15. The machine of claim 11 wherein said first roller is a pattern roller and said second roller is a compression roller, said pattern roller being of substantially greater diameter than said compression roller, one or both of said pattern roller and said compression roller being respectively interchangeable with other pattern rollers and compression rollers of different diameters.

16. The foam cutting machine of claim 11 wherein said drive means comprise first and second drive motors for independently driving said first and second rollers respectively in said surface contouring mode; and controller means connected to said first and second drive motors for independently controlling the speed of rotation of said rollers, said controller means being adjustable for equalizing the speed of surface rotation of said rollers for first and second rollers of different diameters.

17. The foam cutting machine of claim 11 said drive means further comprising a coupling assembly having selectable first and second modes of operation, said first mode of operation being operative for coupling each of said rollers to a corresponding one of first and second drive motors, said second mode of operation being operative for coupling only one of said drive motors to both of said rollers.

18. The machine of claim 17 wherein said coupling assembly comprises a gear train drivingly connected for mechanically interlocking rotation of said rollers in said profiling mode of operation, said gear train including a gear element displaceable from said gear train for drivingly engaging said rollers independently of one another to corresponding ones of said first and second drive motors in said surface contouring mode of operation.

19. The machine of claim 18 wherein said gear element is displaceable in an axial direction thereof between said first and second positions.

20. The foam cutting machine of claim 11 wherein said cutting edge is adjustable between a profiling position generally spaced from said first and second rollers and a surface contouring position substantially tangent to one of said rollers.

* * * * *